Nov. 24, 1942.    G. C. DALMAN    2,302,746
DIRECT CURRENT TRANSFORMER
Filed Feb. 25, 1941
Fig.1.
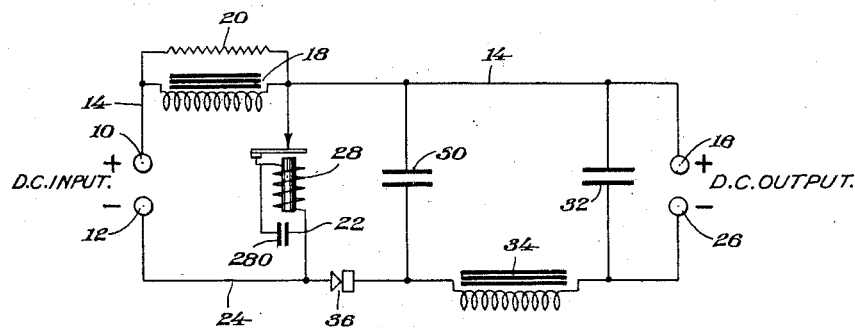
Fig.2.
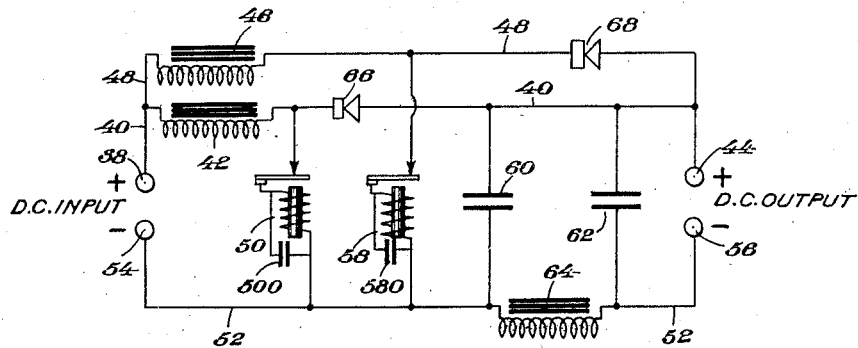
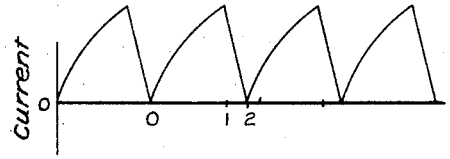
Fig.3.
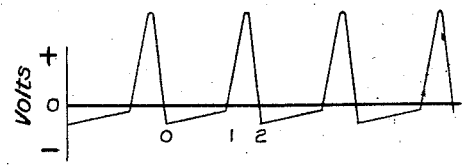
Fig.4.
Gisli C. Dalman,
INVENTOR
BY Victor J. Evans & Co.
ATTORNEYS Patented Nov. 24, 1942

2,302,746

UNITED STATES PATENT OFFICE 2,302,746

DIRECT CURRENT TRANSFORMER

Gisli C. Dalman, New York, N. Y.

Application February 25, 1941, Serial No. 380,540

1 Claim. (Cl. 171—97)

My invention relates to improvements in transformers for obtaining a high direct current output voltage from a low direct current input voltage; and the objects of my improvement are, first, to provide a transformer capable of delivering large output power; second, to produce a transformer of a type permitting the utilization of parts which are cheap; third, to attain high efficiencies; fourth, to eliminate sparks, with consequent elimination of radio frequency interference; and, fifth to secure longer life of the contact points of the vibrator when such a device is employed.

In the accompanying drawing:

Figure 1 is a diagrammatic illustration of a circuit which embodies one circuit arrangement of the invention;

Figure 2 is a diagrammatic illustration of a second form of circuit arrangement; and Figures 3 and 4 are oscillograms illustrating the operation of the invention.

In the embodiment selected to illustrate my invention, the direct current voltage supply is connected to the positive and negative terminals 10 and 12, respectively. In the lead 14, which connects the positive input terminal 10 with the positive output terminal 16, is interposed an inductance 18, the purpose of which is to develop a high voltage in series with and of the same polarity as the input voltage. A voltage limiting impedance 20, such as a pure resistance, is shunted across the inductance 18.

In the lead 22 connected across the lead 14 and the lead 24 between the negative input terminal 12 and the output terminal 26 is interposed a vibrator 28 whose purpose is to present a zero impedance so as to allow a current I to be attained, then to present an infinite impedance to cut off that current from flowing through the vibrator. A condenser 280 is connected across the coil of the vibrator 28, which condenser limits the voltage appearing across the coil and prevents sparking. Condensers 30 and 32 connected with the leads 14 and 24 and an inductance 34 interposed in the lead 24 from a Pi filter whose purpose is to maintain the output voltage constant. Unidirectional current is secured by reason of a diode 36 interposed in the lead 24 between the interrupter 28 and the condenser 30.

In operation, when the vibrator 28 is in its closed position and inductance is directly across the input voltage and the current rises logarithmically, as shown in the 0—1 region of the current oscillogram of Fig. 3. Because of the diode 36, the filter circuit does not affect the current rise under ordinary operating conditions. The voltage oscillogram of Fig. 4, 0—1 region, shows the voltage across the inductance caused by the current rise. It should be noted that the maximum negative voltage equals the input voltage.

The 1—2 regions on the oscillograms correspond to the open position of the vibrator. The current shows a rapid decay since the affected external impedance is high, and because of this decay the high voltage shown in the voltage oscillogram is developed. The filter condensers charge to a value equal to the sum of the input voltage and the positive peak across the inductance. In the 0—1 regions, the condensers supply the power to the load, while in the 1—2 regions, the inductance supplies the power to the load and recharges the condensers making up for the charge lost. With the filter connected across the load, the output voltage builds up to an almost constant value. The filter, maintaining this constant voltage, controls the inductive decay. These two effects occur simultaneously, one affecting the other.

Fig. 2 illustrates a modified arrangement wherein the positive input terminal 38 is connected with a lead 40 in which is interposed an inductance 42, and the lead 40 connects with the positive output terminal 44. An inductance 46 also electrically connects with the terminals 38 and 44 through the medium of a lead 48. A vibrator 50 is connected across the lead 40 and the lead 52 from the negative input terminal 54 to the negative output terminal 56, and a condenser 500 is connected across the coil of the vibrator. A second vibrator 58 is connected across the leads 48 and 52, and condensers 60 and 62 connect across the leads 40 and 52, with an inductance 64 interposed in the lead 52 in the manner of the arrangement of the corresponding parts of Fig. 1. A condenser 580 is also connected across the coil of this vibrator. In the lead 40 is interposed a diode 66 and in the lead 48 is interposed a diode 68.

In the transformer of Fig. 2, the inductances operate to render filtering easier. When one inductance is receiving energy from the input, the other, when the proper phase relation between the vibrators is maintained, is delivering energy to the filter system and load. Additional inductances may be employed, following the same arrangement, and it is possible for the decay portions, 1—2 regions, of some of the inductances to overlap. A further advantage of such an arrangement lies in the fact that the input current is less peaked.

In the present invention, certain parts thereof, with the exception of the inductance or inductances, have equivalent substitutes. As an example, the filter system may be replaced by a battery or generator connected across the load resistance. Also, the diode could be replaced by a vibrator which opens as soon as the current begins to reverse. In addition, the vibrator of the original circuit could be replaced by a rotating commutator, or a triode whose grid voltage is made positive and then suddenly biased to cut off by some voltage source. Another feature resides in the fact that by connecting the filter system and diode across the inductance rather than across the vibrator, the device could be made to step down as well as step up the voltage.

Constant voltage output as the load is changed can be obtained by varying time 0—1, or what is the same, by changing the on and off time of the vibrator. In connection with the circuit of Fig. 2, the vibrators 50 and 58 are operated out of phase but at the same frequency. Thus twice as many voltage peaks are developed than in the circuit of Fig. 1.

Having thus described certain embodiments of my invention in detail, it is, of course, understood that I do not desire to limit the scope thereof to the exact details set forth except insofar as those details may be defined in the appended claim.

I claim:

A direct current transformer comprising two first leads connected in parallel and a second lead, an inductance interposed in each of said first leads, a first vibrator connected across one of said first leads and said second lead, said vibrator including a coil and a condenser connected across the coil, a second vibrator connected across the other of said first leads and said second lead and including a coil and a condenser connected across the coil, said vibrators alternately presenting infinite and low impedance to the output current, a uni-lateral impedance interposed in each of said first leads, filter condensers connected across one of said leads and said second lead, and a filter inductance interposed in said second lead between said filter condensers.

GISLI C. DALMAN.